United States Patent
Gasbarro

(10) Patent No.: US 6,699,116 B1
(45) Date of Patent: Mar. 2, 2004

(54) AUTOMATED POULTRY THIGH SKINNING AND DEBONING APPARATUS

(75) Inventor: Geno N. Gasbarro, Columbus, OH (US)

(73) Assignee: Remington Holdings LTD, Columbus, OH (US)

( * ) Notice: Subject to any disclaimer, the term of this patent is extended or adjusted under 35 U.S.C. 154(b) by 0 days.

(21) Appl. No.: 10/291,937

(22) Filed: Nov. 13, 2002

(51) Int. Cl.[7] ........................ A22C 17/02; A22C 17/04; A22C 17/06; A22C 21/00; A22C 25/16

(52) U.S. Cl. ................ 452/140; 452/135; 452/127; 452/128; 452/125

(58) Field of Search ...................... 452/125, 127, 452/122, 138, 136, 135, 140

(56) References Cited

U.S. PATENT DOCUMENTS

| | | | | |
|---|---|---|---|---|
| 3,324,915 A | * | 6/1967 | Townsend | 452/127 |
| 3,613,153 A | * | 10/1971 | McDonald | 452/172 |
| 3,714,682 A | * | 2/1973 | Harben, Jr. | 452/115 |
| 3,769,903 A | * | 11/1973 | Greider | 452/127 |
| 4,292,710 A | * | 10/1981 | Townsend | 452/127 |
| 4,359,807 A | * | 11/1982 | Adkison et al. | 452/172 |
| 4,402,112 A | | 9/1983 | Gasbarro | 452/140 |
| 4,466,344 A | * | 8/1984 | Schill | 452/127 |
| 4,551,885 A | * | 11/1985 | Molnar | 452/119 |
| 5,236,323 A | * | 8/1993 | Long et al. | 452/127 |
| 5,395,283 A | * | 3/1995 | Gasbarro | 452/172 |
| 5,503,593 A | * | 4/1996 | Schill | 452/127 |
| 5,533,927 A | * | 7/1996 | Schill | 452/127 |
| 5,609,519 A | * | 3/1997 | Townsend | 452/127 |
| 5,697,837 A | * | 12/1997 | Verrijp et al. | 452/170 |
| 5,833,527 A | * | 11/1998 | Hazenbroek et al. | 452/170 |
| 6,264,542 B1 | | 7/2001 | Gasbarro | 452/125 |
| 6,354,932 B1 | * | 3/2002 | Lee | 452/122 |
| 6,579,164 B1 | * | 6/2003 | Groth | 452/125 |

* cited by examiner

Primary Examiner—Charles T. Jordan
Assistant Examiner—Judith A. Nelson
(74) Attorney, Agent, or Firm—Francis T. Kremblas, Jr.; Kremblas, Foster, Phillips & Pollick

(57) ABSTRACT

An automated skinning and deboning apparatus for processing poultry thigh portions to remove the skin and bone from the meat portion in a single pass includes a support frame and housing having a feed inlet and a product discharge outlet. The feed inlet includes a guide chute which aligns the thigh portion such that the longitudinally extending bone is disposed parallel to the chosen path of travel. A first pair of conveyors receives the thigh portion and transports it to a skinning station wherein the skin is pulled away from the underlying meat portion via a pinching or trapping action of the skin engaged between a rotating fin and an arcuate surface of a pinch block mounted along the path of travel. Conveyors continue to transport the skinned thigh product to a deboning station and maintain the thigh portion with the longitudinally extending bone disposed in a parallel relationship with the selected path of travel to deliver the skinned thigh product through a ring-shaped nozzle wherein a plurality of water streams are directed at the juncture of the bone and meat portions to effectively separate the meat from the bone. The separated meat is collected as the bone passes through the ring-shaped nozzle for collection at a separate location.

3 Claims, 10 Drawing Sheets

AUTOMATED POULTRY THIGH SKINNING AND DEBONING APPARATUS

CROSS-REFERENCED TO RELATED APPLICATIONS (Not Applicable)

STATEMENT REGARDING FEDERALLY-SPONSORED RESEARCH AND DEVELOPMENT (Not Applicable)

REFERENCE TO A "MICROFICHE APPENDIX"

(Not applicable)

BACKGROUND OF THE INVENTION

1. Field of the Invention

The present invention relates generally to processing poultry meat and particularly to apparatus and methods employed to remove the outer skin and debone poultry meat portions to provide skinless, boneless, poultry meat products.

2. Description of the Related Art

The poultry industry has for many years produced skinless and deboned poultry meat products for retail sale as a whole or ground up final product. The demand for such poultry products has continued to grow at a significant rate, yet, apparatus and methods priorly and currently used have failed to develop an automated apparatus and method which provide the desired degree of the requirements of efficiency, sanitation, speed, and simplicity of manufacture and operation.

Some improvements in this area are represented, such as described in U.S. Pat. No. 4,402,112 and U.S. Pat. No. 6,264,542. Separate poultry skinning and deboning apparatus are described in these patents which require separate handling of the poultry portions for complete processing.

BRIEF SUMMARY OF THE INVENTION

The present invention relates to a poultry processing apparatus which sequentially combines removal of the outer skin from a poultry thigh portion and separation of the meat from the bone portion in a once through manner. Therefore only a single feeding step is required to achieve the desired skinless and boneless thigh meat product in a highly efficient, sanitary and faster manner.

The present invention incorporates skinning apparatus which pulls, rather than cuts, the outer skin layer from the underlying meat portion similar to that described in my U.S. Pat. No. 6,264,542 which is incorporated by reference herein. The deboning portion of the apparatus includes a water knife for separating the poultry meat portion from the thigh bone of the skinned thigh portion having some structural features similar to those described in my U.S. Pat. No. 4,402,112 which also is incorporated by reference herein.

The present invention also provides an efficient structure to sequentially combine the skinning and deboning operations in a once through process utilizing a single feed inlet and means to control the path of travel and the bone-in thigh portion's disposition relative to the skinning and deboning components to achieve the desired skinned and deboned end product.

Further, the present invention includes improvements related to product handling and the cutting means for separating the meat from the bone. This improves the meat removal function resulting in a higher yield of the final boneless meat product.

DETAILED DESCRIPTION OF THE INVENTION

Figure 1:
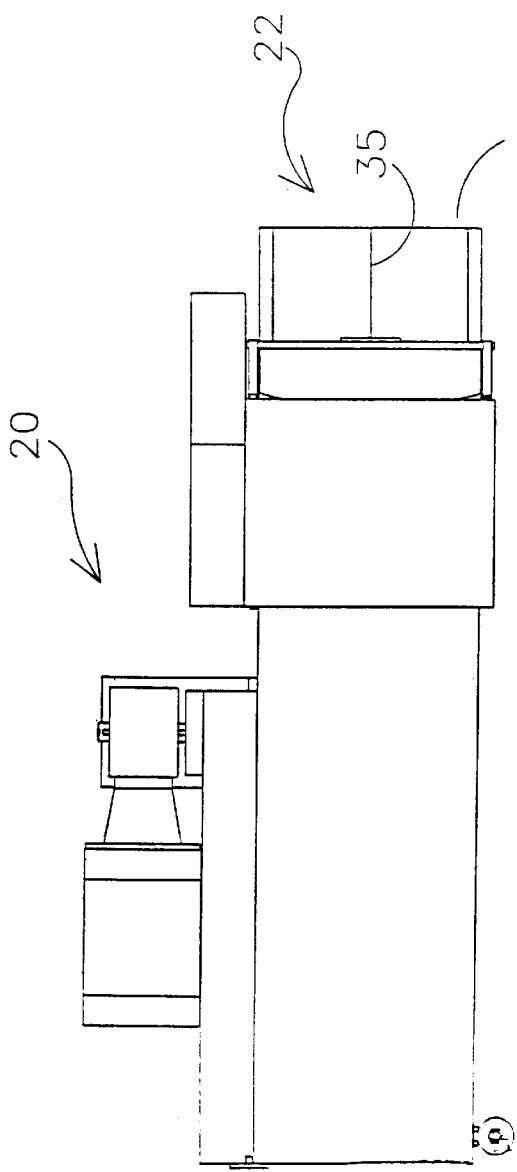
FIG. 1 is a top plan view of an apparatus constructed in accordance with the present invention.
Figure 2:
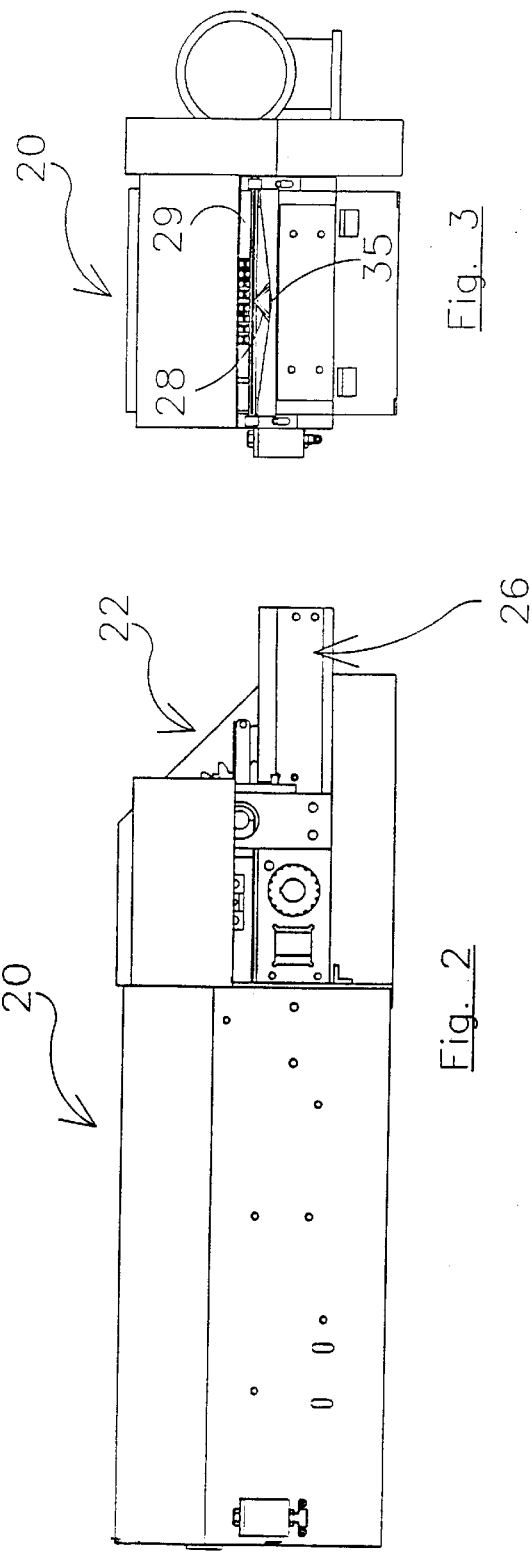
FIG. 2 is side elevational view of the apparatus shown in FIG. 1.
Figure 3:
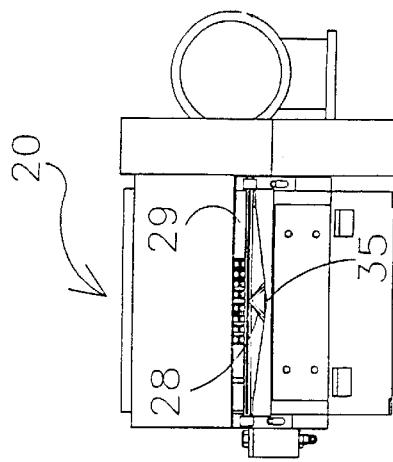
FIG. 3 is a front elevational view of the apparatus shown in the preceding FIGS.
Figure 4:
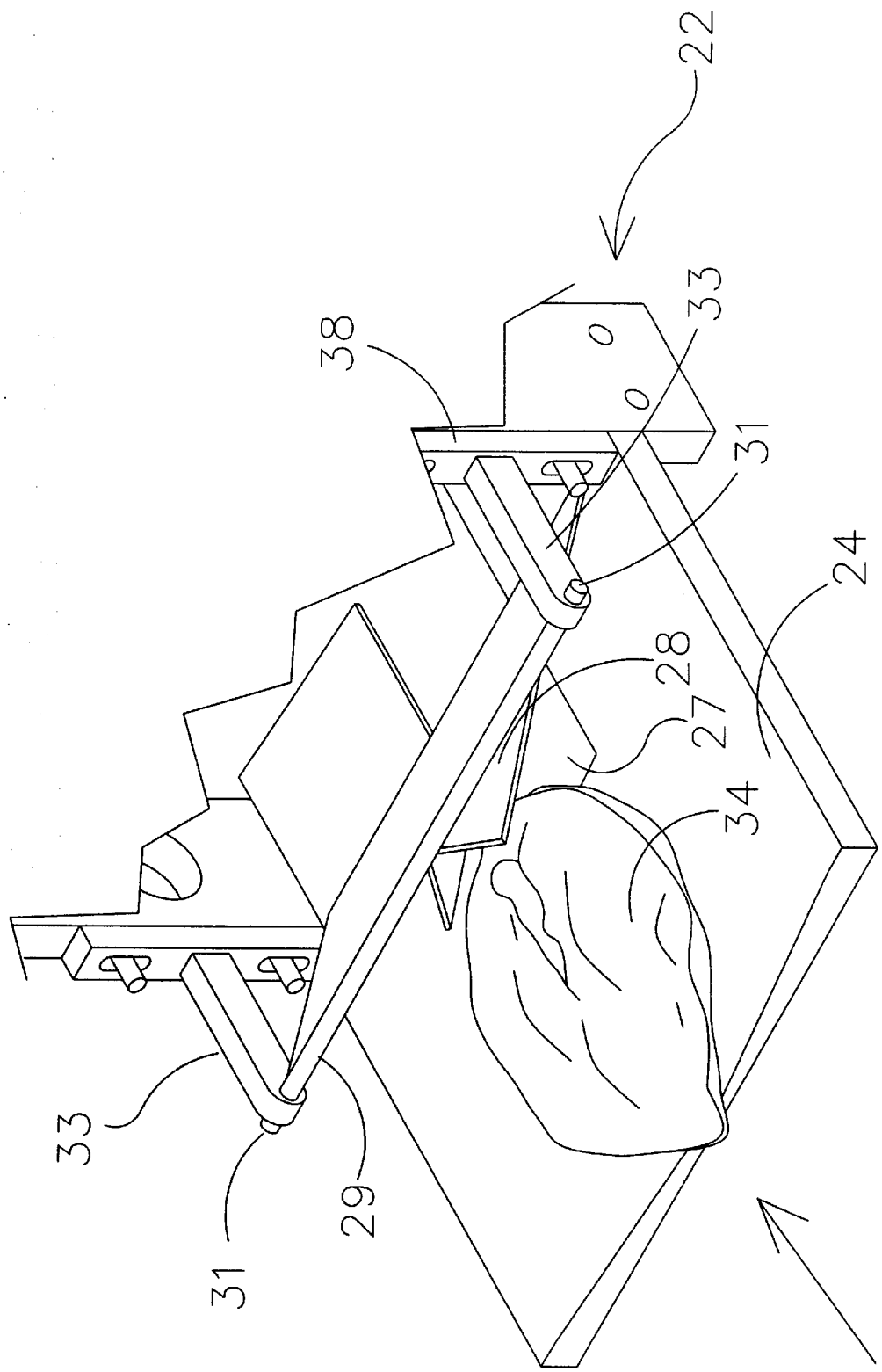
FIG. 4 is a partial perspective view of the apparatus shown in FIG. 1 illustrating a poultry thigh portion entering the feed inlet of the apparatus.

An apparatus for the automated skinning and deboning of poultry thigh portions, indicated generally at 20, is illustrated in FIGS. 1–3 and constructed in accordance with the present invention.

As seen in FIGS. 1–5, a feed inlet station, indicated generally at 22, comprises a generally horizontally extending feed plate or platform 24 which may be fixed to a supporting housing and frame, indicated generally at 26, in any suitable conventional manner. The housing simply encloses the inner working components for sanitation and safety purposes and is conventionally constructed in a well-known manner. Feed plate 24, in cooperation with a pivotally mounted guide chute 28, aid the desired alignment of a poultry thigh portion for travel along a chain-type conveyor 30. The thigh portion 34 is disposed, skin side down with the thigh bone portion longitudinally extending generally parallel to the desired path of travel through the apparatus.

Feed plate 24, preferably has a generally V-shaped configuration, having opposing surfaces inclined toward the middle portion of the plate to form a longitudinal crease or depression 35 along the centerline of chute 28 which is aligned with the center of an opening 27. This configuration aids control of the desired disposition of the thigh portion, such as described above, for processing at the skinning and deboning stations.

Chute 28 is mounted on a generally flat plate 29. Plate 29 is pivotally mounted on a shaft 31 which is supported by a pair of spaced horizontal arms 33. Arms 33 are, in turn, fixed in any conventional manner to a pair of vertical support members 38, such as by welding for example. Members 38, in turn, are welded or fixed in any conventional manner to a portion of supporting frame 26.

An operator places a pre-cut thigh portion including the outer skin and bone, such as 34, on feed plate 24 with the outer skin portion facing downwardly and the bone aligned with the centrally disposed crease 35 in plate 24. Preferably the small end or hip knuckle of the thigh facing toward chute 28. The inclined surfaces of plate 24 aid in assuring centering the thigh portion 34 along the central crease 35 in the desired alignment. The operator then pushes the thigh portion into the forward end of chute which causes the chute 28 and plate 29 to pivot rearwardly and upwardly to fully expose opening 27. The operator continues to feed the thigh portion 34 into chute 28 until the leading end of thigh portion 34 is engaged by endless chain conveyor 40.

Figure 5:
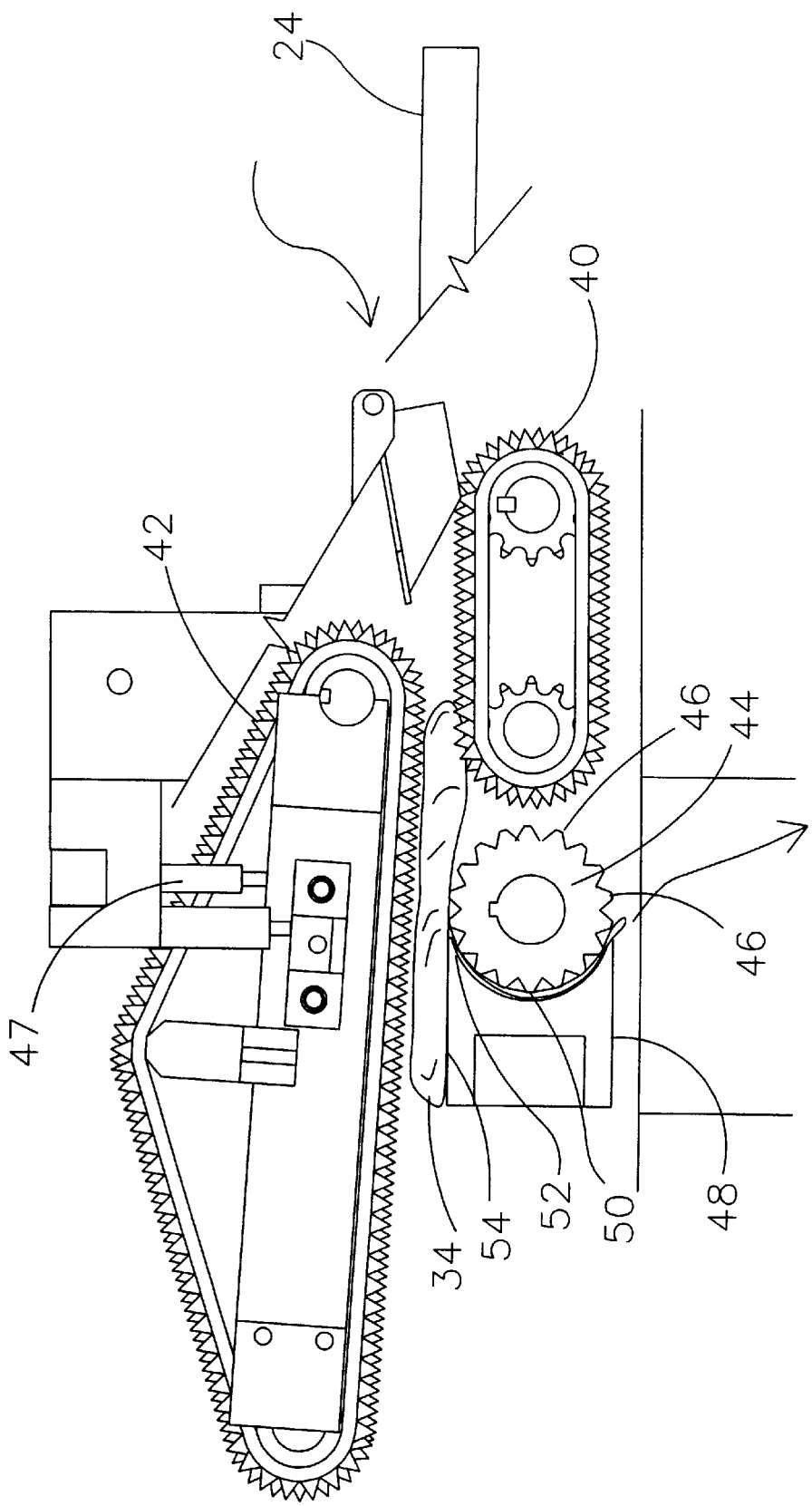
FIG. 5 is a partial side view of the apparatus shown in FIG. 1 having the outer side of the housing enclosure removed to better view the conveying and skinning structures of the apparatus.

Conveyor 40, preferably, is provided with outwardly directed, triangular spikes which aid in moving thigh portion to the left, as viewed in FIG. 5, and into engagement with a similarly constructed upper chain conveyor assembly, indicated generally at 42.

As the leading end of thigh portion 34 is transported toward the rear or left end of conveyor 40 as viewed in FIG. 5, it is engaged by conveyor 42 which is similarly provided with upraised spikes to frictionally grip the leading end of thigh portion 34 while the trailing end is still confined within chute 28. Before the trailing end of thigh portion 34 leaves first conveyor 40, the leading edge of thigh portion 34 is engaged by gripper member 44 conventionally mounted to support frame 26 in a rotatable manner whereby the desired disposition and alignment of thigh portion 34 is controlled at all times by the sequential engagement between chute 28, conveyors 40, 42 and gripper member 44.

Gripper member 44 has substantially the same construction as the same member disclosed in my U.S. Pat. No. 6,264,542 incorporated herein by reference. Also, the function of gripper member 44 carrying radially extending fins, such as at 46, in cooperation with a pinch block 48 provided with an arcuate surface 50, function in the same manner as disclosed in said patent.

As described in this U.S. Pat. No. 6,264,542, as the thigh portion 34 is transported toward pinch block 48 as described above, the outer skin of thigh portion is pinched or effectively entrapped in the close clearance opening between the outer end of each fin 46 and the leading edge 52 of the arcuate surface 50. Upon continued rotation of gripper member 44 and fins 46 and the action of conveyor 42, the outer skin is continuously pulled away from the adjacent meat portion as thigh portion 34 is transported to the left as viewed in FIG. 5. Pulling the skin from the underlying meat portion as opposed to cutting or piercing the skin is desirable as the latter tends to damage, tear or cut the underlying meat layer and/or requires continuous engagement of a sharp knife edge between the outer skin layer and the underlying meat portion. However, gripping or entrapping a portion of skin in accordance with the present invention only requires intermittent engagement with spaced portions of the skin because the portions of the skin not engaged by fins 46 are also pulled away from the underlying meat layer by the engagement of the adjacent skin portions trapped between a fin 46 and arcuate surface 50.

This pulling action is significantly less likely to remove or damage the underlying meat layer and therefore maximizes the yield of the desired skinless poultry product as compared to prior art meat skinning apparatus used on poultry or other products. The downward force applied to the thigh portion may be controlled within appropriate limits by a bias force applied against the conveyor 42 by a spring or by a gas shock absorber, such as 47 conventionally mounted to conveyor 42 and housing frame 26.

Figure 6:
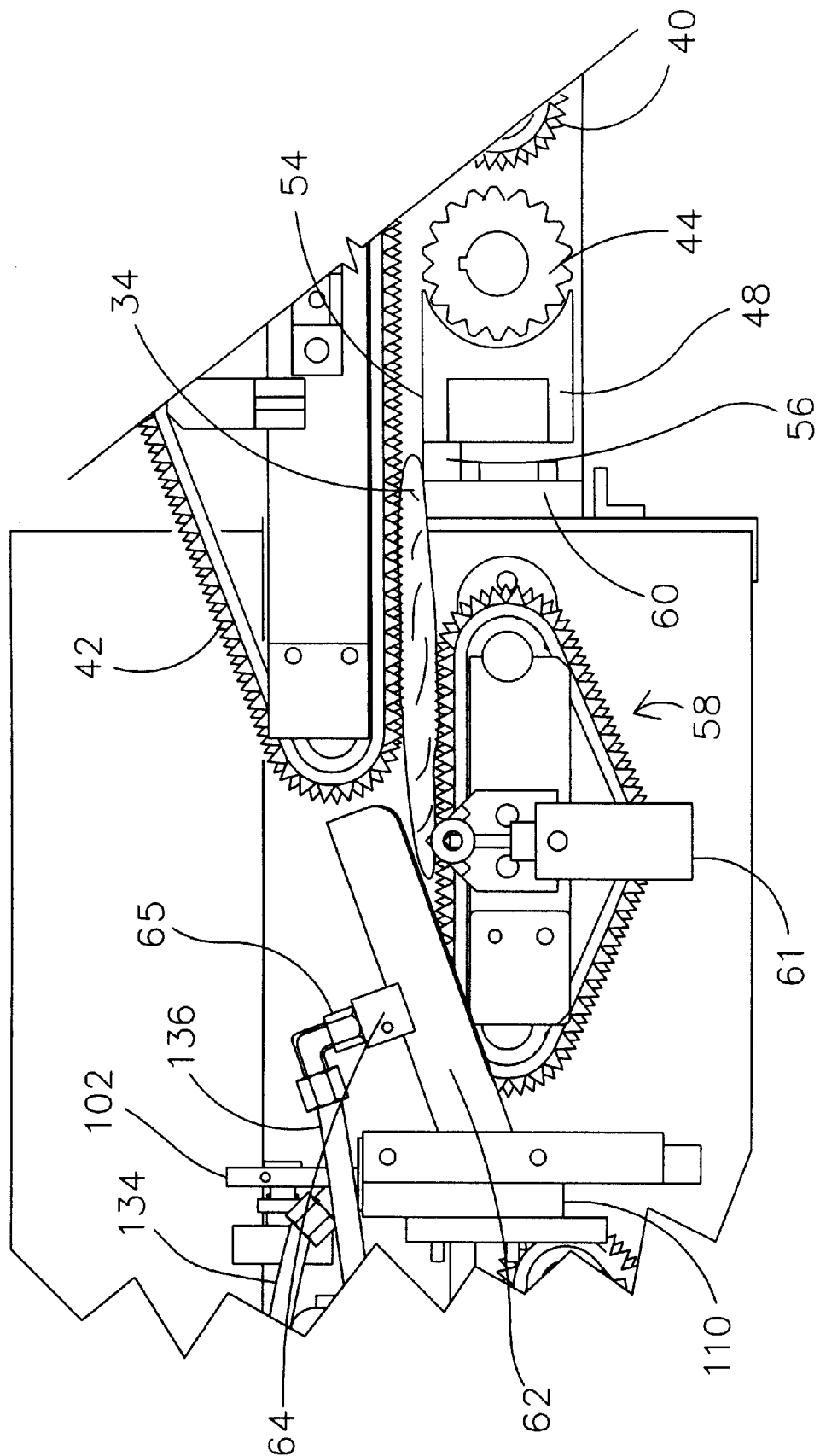
FIG. 6 is a partial side view of the apparatus shown in FIG. 1 having the side of the housing enclosure removed to better illustrate the transport of the poultry thigh portion from the skinning station to the deboning station and structural components of the deboning operation.

Still referring to FIG. 5, as thigh portion 34 passes gripping member 44, it continues to be transported rearwardly to the left via the action of conveyor 42 and gripper member 44 and is supported by the upper surface 54 of pinch block 48. As best seen in FIG. 6, before the trailing end of thigh portion leaves upper surface 54, which may be extended by a spacer block 56 for manufacture and assembly convenience, the leading end of thigh portion 34 engages another conveyor 58 having a forward end spaced below the rear end portion of conveyor 42 such that control of the disposition and alignment of thigh portion 34 is maintained in the same position as described earlier herein. The bottom of thigh portion 34 may be unsupported for a relatively short distance prior to being engaged and supported by lower conveyor 58 because the thigh bone 36 to which the meat portion of thigh 34 is attached provides sufficient rigidity to maintain the desired control of the position of thigh portion 34. Further, a major portion of thigh portion 34 is still engaged between conveyor 42 and spacer member 56 and an upper surface of a frame portion 60 of supporting frame 26 which supports pinch block 48.

The disposition and alignment of the now skin-free thigh portion 34 is particularly important at this stage as the thigh portion is transported to and through the deboning station. Thigh portion 34 engaged between conveyors 42 and 58 is transported into and engaged by a second guide chute 62 fixed at an inclined angle leading thigh portion 34 past a water knife 64 mounted on the top of chute 62. Water knife 64 directs a pressurized stream of water into chute 62 at a central point to create a longitudinally extending score or slice in the upper part of the meat of thigh 34, preferably to a depth aligned with and exposing substantially the full length of the longitudinally extending bone 36 in the thigh portion 34. Water Knife 64 is operatively connected to a source of pressurized water via a conventional fitting 65 adapted to receive a compatible fitting disposed on the end of a conduit in the form of hose 136. Similarly to conveyor 42, conveyor 58 is preferably biased to apply appropriate force upon thigh portion 34 disposed between the conveyor 58 and chute 62 by another gas shock 61 to maintain the desired control of the disposition of thigh portion 34 during its conveyance along the selected path of travel.

This longitudinal score of the upper part of the meat overlying the bone 36 facilitates the complete removal of the meat from the bone by the nozzle 66 as described below. It should be noted that a conventional rigid knife blade could be substituted for water knife 64, however, water knife 64 is preferred for sanitary reasons as well as avoiding inadvertent cutting of the bone which may cause chips or slivers of bone to be removed with the meat portion and contaminate the desired boneless meat end product.

Figure 7:
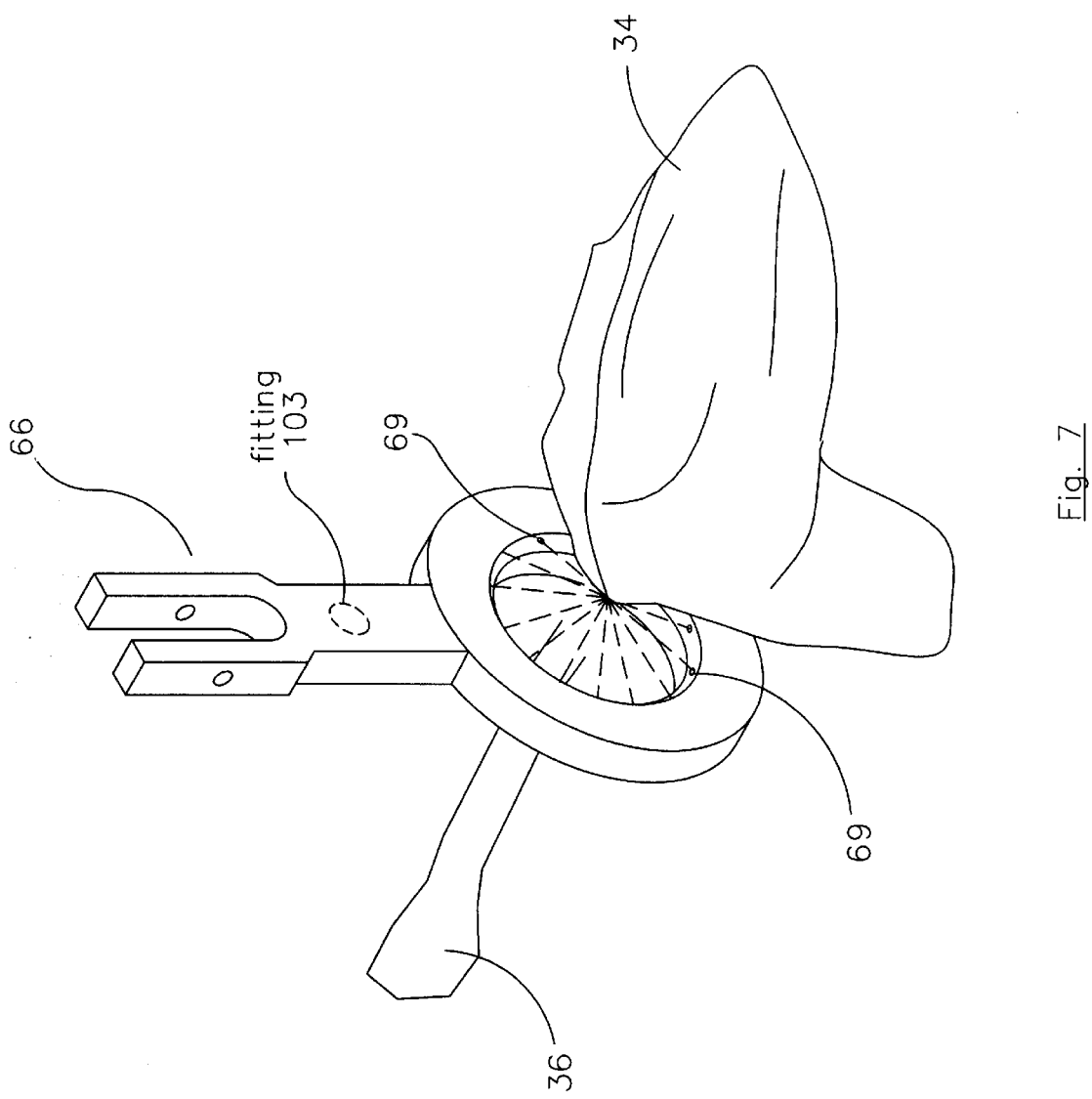
FIG. 7 is a partial perspective view of the circumferential water knife shown isolated from the remainder of the apparatus shown in the preceding FIGS.

As best illustrated in FIG. 7, a ring shaped nozzle 66, supported in housing frame 26, is provided with a plurality of circumferentially spaced, generally radially directed outlet ports 69. Each outlet ports 69 directs a fine stream of high pressure water at an acute angle designed to converge toward a common point slightly in front of nozzle 66 to contact thigh portion 34 at the juncture of the meat portion 34 to the longitudinally extending thigh bone 36. The liquid streams form a water knife capable of separating the meat from the bone 36 as thigh portion 34 is transported through chute 62 toward the center of ring shaped nozzle 66 via conveyors 42 and 58.

Ring-shaped nozzle 66 is conventionally provided with an annular passage, not shown, communicating with a bore or passage, not shown, extending upwardly within leg 102 which communicates with an inlet port provided with a conventional threaded fitting 103 configured to removably receive a connecting conventional fitting on the end of a suitable conduit such as in the form of hose 134.

Figure 8:
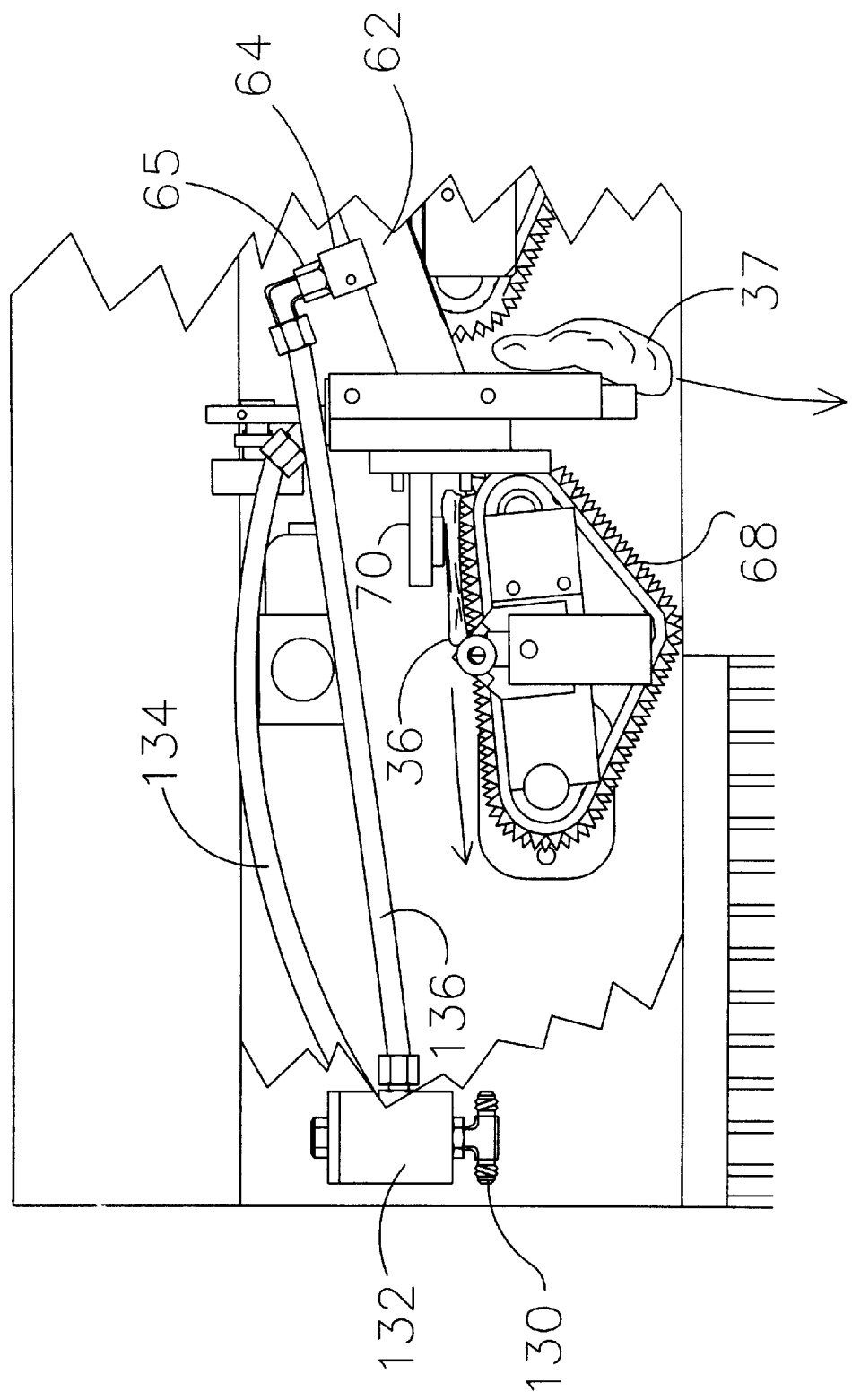
FIG. 8 is a partial side view of a portion of the apparatus shown in FIG. 1, having a side of the housing enclosure removed to illustrate a portion of the deboning station showing the separate exit paths of the deboned poultry meat portion and the bone portion.

As the meat is separated from the joinder with the bone, the inside diameter of nozzle 66 is selected to prevent the meat portion from passing through the central opening of nozzle 66 and yet permit the bone 36 to pass through the nozzle opening as depicted in FIG. 7. This maximizes the meat yield. As the bone 36 continues through the central opening of nozzle 66 and the trailing end of thigh portion 34 encounters the plurality of water streams emitted from ports 69, the last portion of the meat is disengaged from the bone 36 and the deboned meat portion 37 falls downwardly, see FIG. 8, to a conventional conveyor or collection bin, not shown. Water under sufficiently high pressure may be delivered in a conventional manner via an inlet port 130 to a water filter 132 and hoses 134 and 136 to each of the water knife components 64 and 66.

The now meatless bone 36 continues to be transported through nozzle 66. As the leading end of the thigh bone 36 passes through the center of nozzle 66, it is engaged between another conveyor 68, of similar construction to conveyors 40, 42 and by an extractor chute 70. Conveyor 68 and chute 70 cooperate to direct the bone 36 rearwardly until it falls from the rearward end of conveyor 68 to a collection area separate from the collection area for the deboned meat product. The means of separate collection of the meat and bone portion may be any suitable conventional form, such as a bin or a belt conveyor for example.

In one preferred embodiment, nozzle 66 is mounted within the housing for rotational oscillation. It has been found that this rotational oscillating action of the nozzle enhances the removal of the meat portion from the bone, particularly as applied to larger poultry thighs, such as turkey thigh portions, for example.

Figure 10:
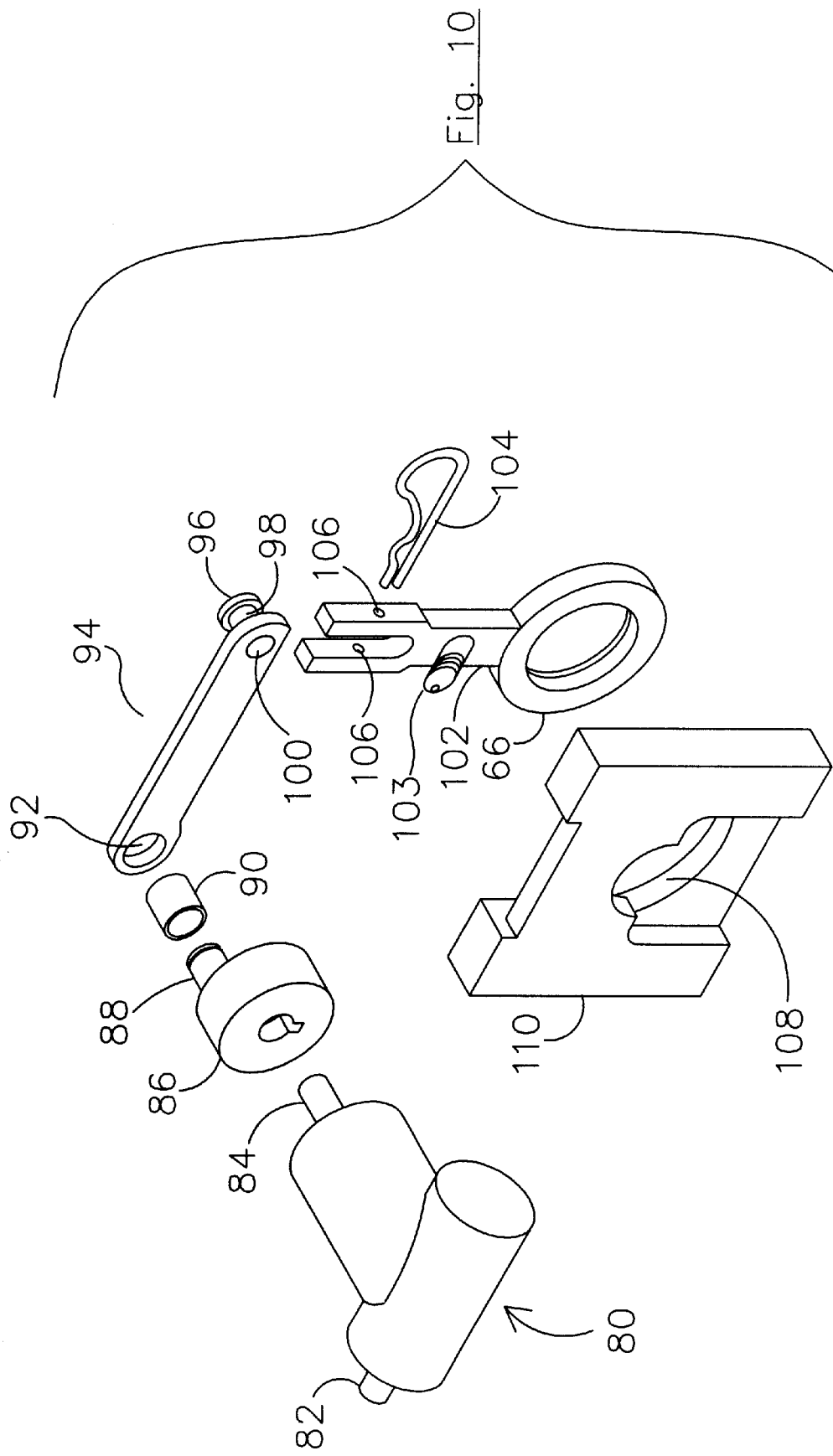
FIG. 10 is an exploded view of the nozzle and associated components employed to provide an oscillating motion to the nozzle, shown apart from the remaining parts of the apparatus illustrated in the preceding FIGS.
Figure 11:
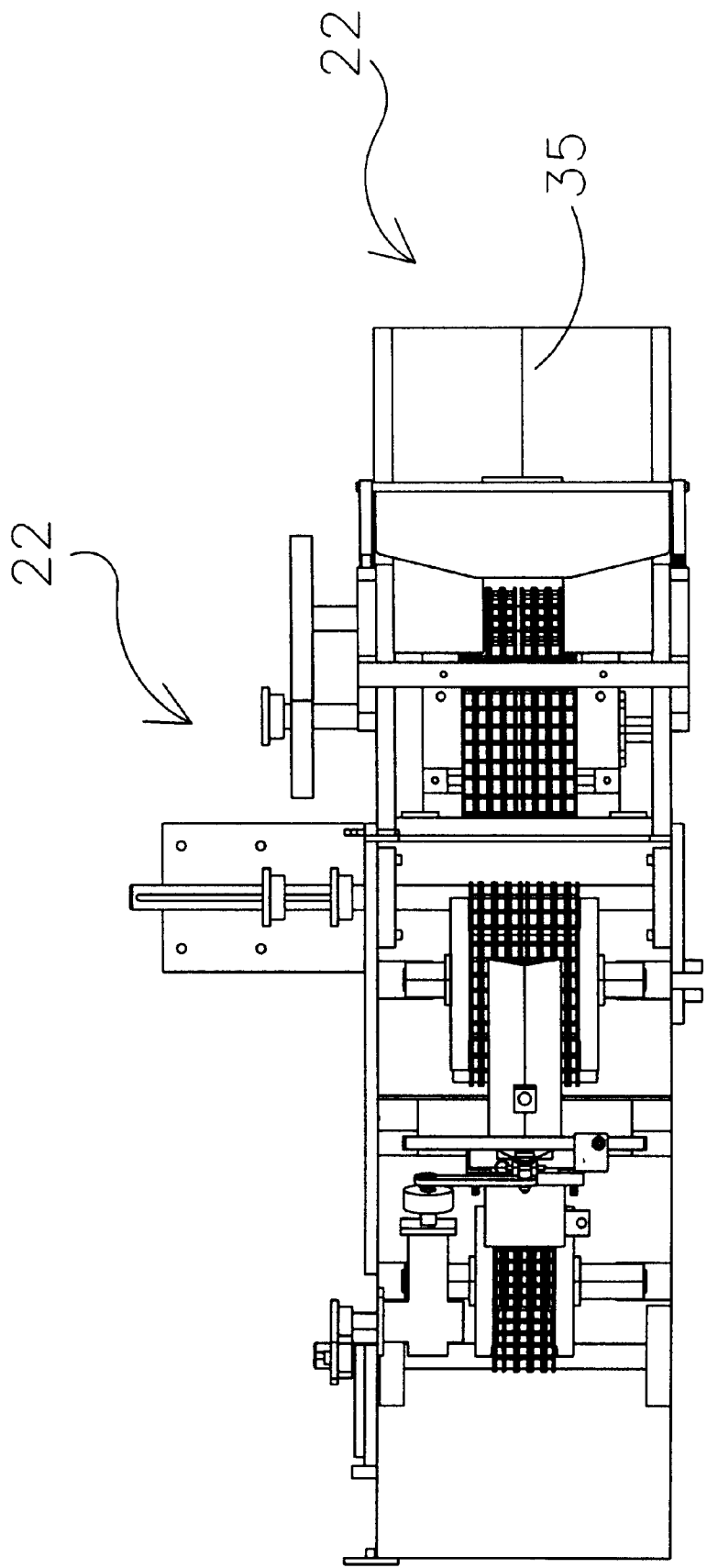
FIG. 11 is a top plan view of the apparatus shown in FIG. 1 with the top cover removed to provide a better view of the arrangements of components.
Figure 12:
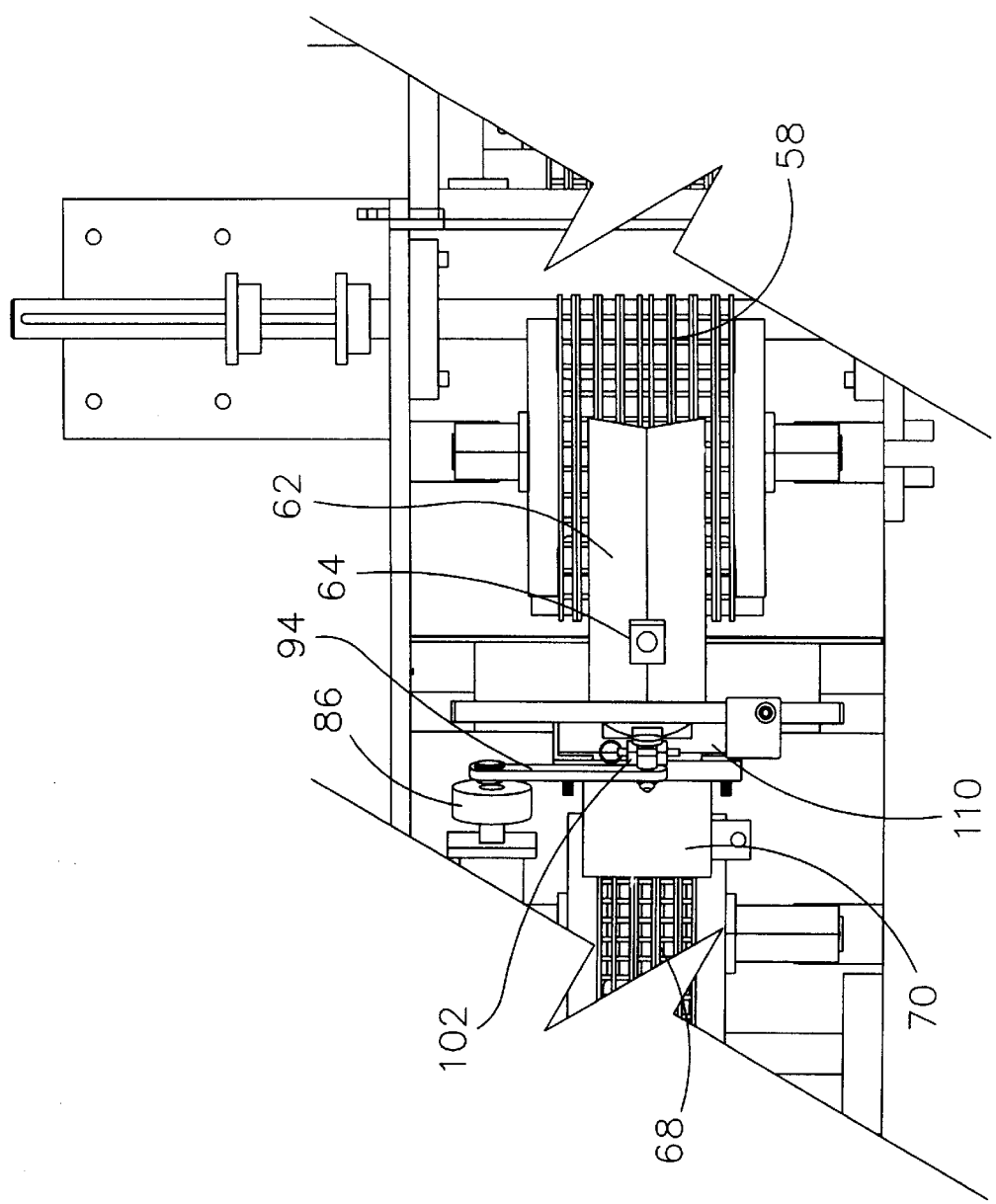
FIG. 12 is a partial top plan view of the apparatus shown in FIG. 11, illustrating the deboning station and associated components forming a part of the present invention.

As best seen in FIG. 10, a preferred manner of providing the oscillating action is shown, however, other means and structures to accomplish this function would be well-known to those skilled in the art and expected to provide adequate and equivalent results.

With reference to FIG. 10, a conventional right angle gear box, indicated generally at 80, includes shafts 82 and 84 perpendicularly mounted relative to another. Shaft 84 is connected to an oscillator cam 86 in any suitable conventional manner, such a keyed relationship, so that cam 86 rotates with rotation of shaft 84.

A stub shaft 88 provided on cam 86 extends outwardly in an off-axis relationship. Shaft 88 is fixed within a bushing 90, which in turn is press fit into a bore 92 provided near one end of a cam arm 94. The opposing end of cam arm 94 carries a pin 96 provided with a circumferential groove 98. Pin 96 may be mounted to arm 94 by a press fit within a bore 100 provided in arm 94 or in any other suitable manner.

Nozzle 66 is provided with a vertically extending fixed leg 102. The upper portion of leg 102 includes an open generally U-shaped fork configuration adapted to be received within groove 98 provided in pin 96 in a rotatably mounted manner via a conventional cotter pin 104 which extends through aligned holes 106 in leg 102.

Upon fully extending the fork configuration of leg 102 upwardly into engagement with groove 98, holes 106 are located so that upon insertion of pin 104, leg 102 is held in position on pin 96. The ring-shaped portion of nozzle 66 is mounted to permit rotation within an annular groove 108 provided within a nozzle holder 110.

Nozzle holder 110 may be mounted within the housing frame assembly 26 in any conventional manner and restricts any movement of the ring-shaped nozzle portion in a vertical or horizontal direction, yet permits rotary oscillation from the center of the opening in ring-shaped nozzle 66 in both a clockwise and counterclockwise direction through an angle dictated by the crank arm arrangement. It has been found that an angular rotation through an arc of about 56 degrees works well for purposes of the present invention.

Rotation of gear box shaft 84 causes rotation of oscillator cam and shaft 88. The oscillating motion of nozzle 66 tends to improve the separation of meat from the bone by enhancing the cutting action of the fluid streams released from nozzle 66.

Figure 9:
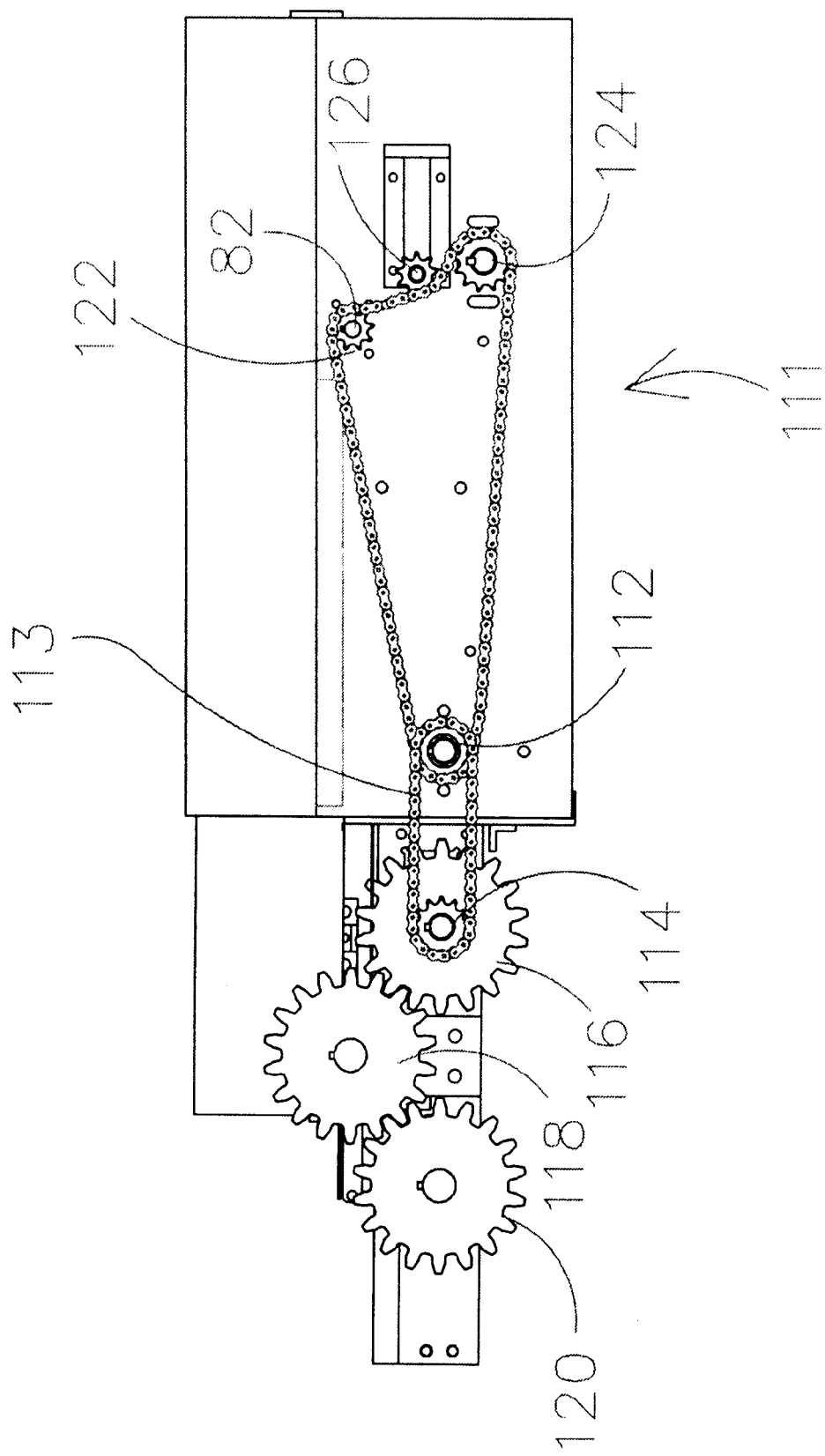
FIG. 9 is a partial view of the apparatus shown in FIG. 1 illustrating a preferred gear and chain drive arrangement forming a portion of the apparatus constructed in accordance with the present invention.

The drive arrangement for the various moving parts may be provided in any suitable conventional manner well-known to those skilled in the art. One preferred embodiment is shown in FIG. 9.

A motor, preferably electric, is operatively connected to a conventional gear box, indicated generally at 111, whose driven shaft is operatively connected to sprocket 112. Sprocket 112, via drive chain 113 drives sprocket 114. The shaft mounted to sprocket 114 is commonly connected to the gripper member 44 and gear 116. Gear 116 drives gear 118, which in turn, drives gear 120. Gear 120 is operatively connected to drive lower conveyor 40 and gear 118 is operatively connected to drive upper conveyor 42. Sprocket 112 also is operatively connected via chain assembly 113 to drive sprockets 122 and 124.

Sprocket 122 is operatively connected to shaft 82 to drive the gear box 80 which is operatively connected to the components which provide the oscillating motion of nozzle 66 as earlier described herein.

Sprocket 124 is operatively connected to the bone extractor conveyor 68. Sprocket 126 performs a conventional chain tensioner function to adjust the tension in the chain assembly mounted on the sprockets described.

In view of the foregoing description, it should be understood by one skilled in the art that the present invention provides a highly efficient apparatus to remove the skin and meat portion from a poultry thigh portion in a high volume, cost effective manner and reduces manual labor while increasing productivity.

What is claimed is:

1. An automated poultry skinning and deboning apparatus for processing poultry thigh products having an outer skin and a meat portion including a longitudinally extending bone comprising, in combination:

a) a support frame and housing provided with a frontal opening defining a feed inlet and a second opening defining a product discharge outlet, said feed inlet including a guide chute to receive said poultry thigh portion with said longitudinally extending bone disposed parallel to a selected path of travel;

b) an upper and lower conveyor disposed within said frame in vertical spaced relationship to one another and configured to receive said poultry thigh portion passing through said guide chute and transport said thigh portion along said selected path of travel;

c) a gripper member rotatably mounted to said frame at a position downstream from said lower conveyor relative to said path of travel and vertically spaced below the upper conveyor and including a plurality of outwardly extending circumferentially spaced fins having outer ends for engaging a lower side of a thigh portion passing between said upper conveyor and said gripper member;

d) a pinch block mounted to said frame and including an arcuate surface disposed in close clearance relationship to an arcuate path of travel of the outer end of said fins during a portion of their rotation to cooperatively define an opening configured to frictionally entrap the outer skin attached to said thigh portion between the outer end of said fins and the surface of said pinch block to pull the outer skin from said thigh portion without cutting the outer skin or the meat portion underlying said skin of the thigh portion engaged by said fins;

e) said pinch block including an upper surface extending beyond said gripper member and below said upper conveyor configured to maintain a force transmitting relationship between said thigh portion and said upper conveyor to continue transport of said thigh portion with said longitudinally extending bone maintained in a position parallel to said selected path of travel toward a deboning station;

f) said deboning station including
 i) a third conveyor mounted to said frame and having a forward portion disposed below said upper conveyor and vertically aligned with said upper surface of said pinch block to engage said thigh portion for continued transport of said thigh portion along said selected path of travel;
 ii) a deboning guide chute mounted in overlying relationship to a portion of said third conveyor disposed downstream from said forward portion to receive said thigh portion between said chute and said third conveyor to transport said thigh portion along said selected path of travel and maintain said bone disposed in parallel relationship to said selected path of travel;
 iii) a knife means mounted on said guide chute to engage an upper surface of the thigh portion and impart a longitudinally extending score in said meat portion generally aligned along said bone of the thigh portion during transport of the thigh portion along said guide chute;
 iiii) a generally ring shaped nozzle mounted within said housing and having a central opening, an annular passage surrounding said opening, an inlet port and a plurality of outlet ports in communication with said annular passage, said outlet ports spaced about the circumference of said central opening and being disposed to inwardly direct a plurality of fluid streams at an acute angle relative to the longitudinal disposition of the bone of a thigh portion exiting said deboner guide chute to impinge at adjacent points about the intersection of the meat portion with the bone exposed to said streams to cause separation of the meat portion from the bone portion as the thigh portion is advanced toward said central opening along said selected path of travel;

g) a source of pressurized fluid operatively communicated to the inlet port of said annular passages, and h) a first collection area for the meat portion separated from said bone and a separate second collection area for the bone passing through said nozzle.

2. The apparatus defined in claim 1 wherein said ring shaped nozzle is mounted in said housing for rotational oscillation about the axis of the central opening of said nozzle.

3. A method of skinning and deboning a poultry thigh portion in a one pass system, the thigh portion having the skin and primary thigh bone in tact with the meat portion of the thigh, comprising the steps of:

a) transporting the poultry thigh to the inlet of a skinning station with the length of the bone aligned in parallel relationship to a selected path of travel;

b) engaging the skin of the poultry thigh in the skinning station and pulling the skin from the meat portion;

c) continuing engagement of the thigh portion after the skin has been removed to maintain said parallel alignment of the bone within said thigh to the path of travel and transporting the thigh portion to an inlet of a deboning station;

d) making a longitudinal score on an upwardly facing surface of said poultry thigh as it moves to the inlet of said deboning station;

e) continuing to cause said poultry thigh to move in a parallel direction to the longitudinal dimension of the bone within said thigh portion and through a central opening in a ring-shaped nozzle having an upstream and downstream side relative to said path of travel of said thigh portion, said nozzle provided with a plurality of radially inwardly directed streams of pressurized liquid arranged to intersect at a point on the upstream side of the central opening of said nozzle and engage said thigh at a plurality of points closely adjacent to the junction of the meat portion and the bone of said thigh to cause said meat portion to separate from said bone and fall downwardly from the upstream side of said nozzle for collection as said bone moves through said central opening of said nozzle; and d) collecting the thigh bone passing through said nozzle on the downstream side and separate from the collection of removed meat portion.

* * * * *